Feb. 23, 1926.
T. B. MURRAY
1,573,848
GUDGEON PIN MOUNTING FOR PISTONS
Filed Nov. 23, 1925
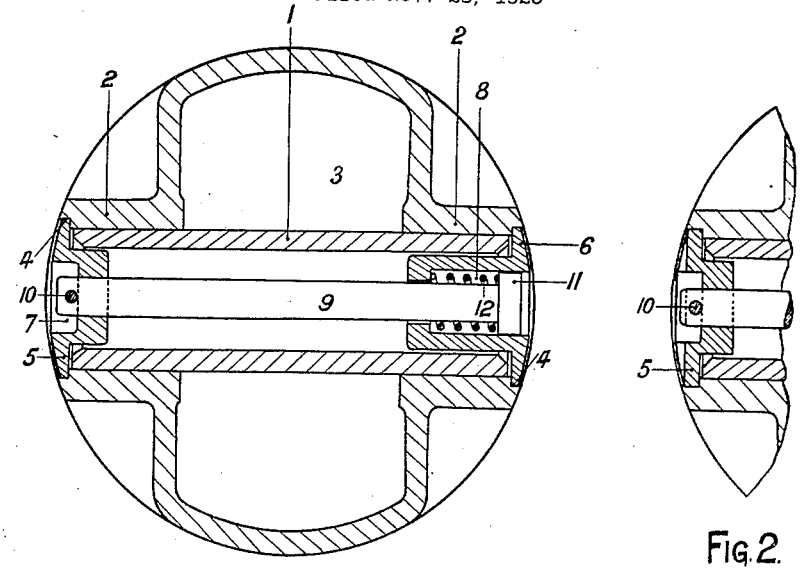
Fig.1.
Fig.2.
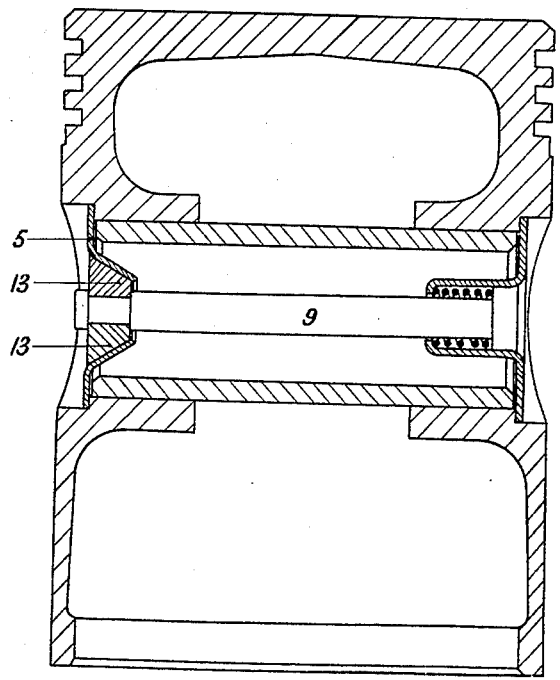
Fig.3.
Inventor:
Thomas Blackwood Murray,
by Palmer Watson
Attorneys.

Patented Feb. 23, 1926.

1,573,848

UNITED STATES PATENT OFFICE.

THOMAS BLACKWOOD MURRAY, OF GLASGOW, SCOTLAND.

GUDGEON-PIN MOUNTING FOR PISTONS.

Application filed November 23, 1925. Serial No. 70,933.

*To all whom it may concern:*

Be it known that I, THOMAS BLACKWOOD MURRAY, a subject of the King of Great Britain and Northern Ireland, and residing at Glasgow, Scotland, have invented a certain new and useful Improvement in Gudgeon-Pin Mountings for Pistons, of which the following is a specification.

This invention relates to a gudgeon pin mounting for pistons, particularly of internal combustion engines, of the type in which the gudgeon pin—of simple tubular form—is located or confined axially by heads received in recesses in the periphery of the piston and connected by a tie member.

An object of the invention is to provide a simple fitting capable of being readily assembled and dismantled without necessity for the use of any special tool.

Another object is to provide a fitting which is not liable to rattle or work loose in the operation of the engine.

Yet another object is to provide a construction necessitating only simple machining operations on the piston.

With these and other objects in view in the gudgeon pin mounting according to the invention the gudgeon pin is located or confined axially by heads seated in recesses at diametrally opposite points in the periphery of the piston and connected by a tie-rod co-operative at one end with a retaining device engageable with one head and headed at its other end to present a stop between which and the bottom of a pocket in the other head is interposed a compression spring, which accommodates expansion of the piston.

The retaining device referred to may take the form of a cotter pin or the like which, in the assembled position of the gudgeon pin, is received in a recess in one of the heads; or the retaining device may be in the form of a split cone, for example.

Three embodiments of the invention are illustrated by way of example in the accompanying drawings in which Fig. 1 is a sectional plan of a piston with the gudgeon pin and its locating means. Fig. 2 represents a variant. Fig. 3 is a vertical section illustrating a modification.

Referring firstly to Fig. 1, 1 denotes the tubular gudgeon pin mounted in bosses 2 in the wall of the piston 3. In the outer periphery of the piston 3 in register with the bosses 2 are formed circular recesses 4, 4 in which are seated the gudgeon pin heads 5, 6 which are circumferentially clear of the bore of the gudgeon pin but prevent its axial movement. The head 5 is formed with a shallow recess 7 and the head 6 with a deeper recess or pocket 8. The rod 9 passed through the bore of the gudgeon pin and penetrating the heads 5, 6 is fitted in the recess 7 with a retaining pin or cotter 10, of circular or other convenient cross section and at its opposite end is formed with a head or flange 11 accommodated in the pocket 8. Between the head 11 and the bottom of the pocket is interposed a compression spring 12 which accommodates expansion of the piston. By the action of the spring 12 the pin 10 is at all times held close against the bottom of the recess 7 and secured against rattling or working loose.

In the variant represented in Fig. 2 the head 5 is formed with a slot permitting convenient insertion of the pin 10 without necessity for compressing the spring to the extent necessary in assembling the fitting shown in Fig. 1. In this variant, the head of the tie rod may be notched to permit it to be conveniently rotated into position with the cotter-hole in alignment with the slot.

In the modification illustrated in Fig. 3, there is substituted for the cotter 10 a retaining device in the form of a split cone 13 fitted to a reduced portion of the tie rod, and adapted to engage conformably a conical depression in the head 5.

What I claim is:

1. In a gudgeon pin mounting for pistons, in combination with a piston having recesses at diametrically opposed points on the periphery thereof, a tubular gudgeon pin located in register with said recesses, gudgeon pin heads seated in said recesses and serving to confine said gudgeon pin axially, one of said heads having a pocket, a tie rod concentric with said pin and passing through said heads, said tie rod having a head at one end and a retaining device at its other end, and a compression spring located between the head on said rod and the bottom of said pocket.

2. In a gudgeon pin mounting for pistons, in combination with a piston having recesses at diametrally opposed points on the periphery thereof, a tubular gudgeon pin located in register with said recesses, recessed gudgeon pin heads seated in said recesses and serving to confine said gudgeon pin axially, a tie rod penetrating said pin and said heads, said tie rod being headed at one end, a compression spring between the rod head and the bottom of the recess in one gudgeon pin head, and a cotter pin received in the recess in the other gudgeon pin head and engaging the other end of said tie-rod.

In testimony whereof I have signed my name.

T. BLACKWOOD MURRAY.